United States Patent
Doel et al.

[15] 3,643,712
[45] Feb. 22, 1972

[54] TREE-SHEARING HEAD

[72] Inventors: R. Garth Doel; William H. Bricknell; Stephen Osipenko, all of Fort William, Ontario, Canada

[73] Assignee: Hawker Siddeley Canada Ltd., Toronto, Ontario, Canada

[22] Filed: June 9, 1969

[21] Appl. No.: 831,491

[30] Foreign Application Priority Data

June 28, 1968 Canada..................................023,815

[52] U.S. Cl............................................144/34 E, 144/3 D
[51] Int. Cl.......................................................A01g 23/02
[58] Field of Search......................144/3 D, 34, 34 E, 309 AC

[56] References Cited

UNITED STATES PATENTS

| | | | |
|---|---|---|---|
| 3,140,736 | 7/1964 | Propst | 144/3 |
| 3,277,936 | 10/1966 | Larson | 144/34 |
| 3,294,131 | 12/1966 | Larson | 144/34 |
| 3,468,352 | 9/1969 | Larson et al. | 144/34 |
| 3,487,864 | 1/1970 | Larson et al. | 144/3 |
| 3,527,272 | 9/1970 | Hamilton | 144/3 D |

*Primary Examiner*—Gerald A. Dost
*Attorney*—Stevens, Davis, Miller & Mosher

[57] ABSTRACT

A tree-shearing head for use at the end of a boom attached to a logging vehicle has a shear with an associated tree retaining means which retains the butt of the sheared portion of the tree after cutting. A tree grasping means is spaced above the shearing means, and is pivotable with respect thereto, so that the tree can tilt during the shearing and while being grasped, thereby reducing binding of the shearing means.

3 Claims, 5 Drawing Figures

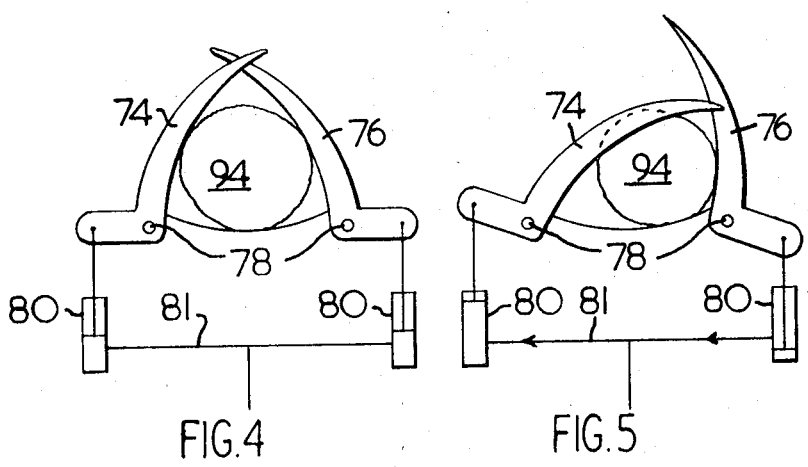

TREE-SHEARING HEAD

This invention relates to logging and specifically to a shear head for felling trees and adapted for operation on a tree processor such as a feller-buncher.

There are various mechanisms used in tree felling, some of these mechanisms utilizing tall mast members for retaining the tree in one position while it is being severed or felled by a shear or saw at a lower level. After the tree has been severed, it is usually passed on to a subsequent logging operation.

There are numerous disadvantages, however, with the known types of shear heads and associated mast members, one such disadvantage being that as the shears are brought into a cutting position and are forced through the body of the tree, the weight of the tree binds downwardly onto the shear blades because the tree is held quite rigidly by the upper part of the mast. Further, some shearing members have an extremely high vertically oriented mast member and these tend to get fouled up in low branches of some species of trees.

The present invention provides improvements in shearing and felling heads for tree processors by including means between clamping and severing sections to allow a certain amount of upward movement of the tree trunk as the shears are driven into the body of the tree. This inhibits the binding on the blades mentioned previously. Additionally, the means for clamping the tree according to the present invention are so arranged hydraulically that they provide an automatic pressure lock in the hydraulic system to inhibit sideways movement of the tree after severing.

The invention will now be described by way of example with reference to the accompanying drawings in which:

FIGS. 4 and 5 are plan views of the gripping arms with their hydraulic circuitry.

Figure 1:
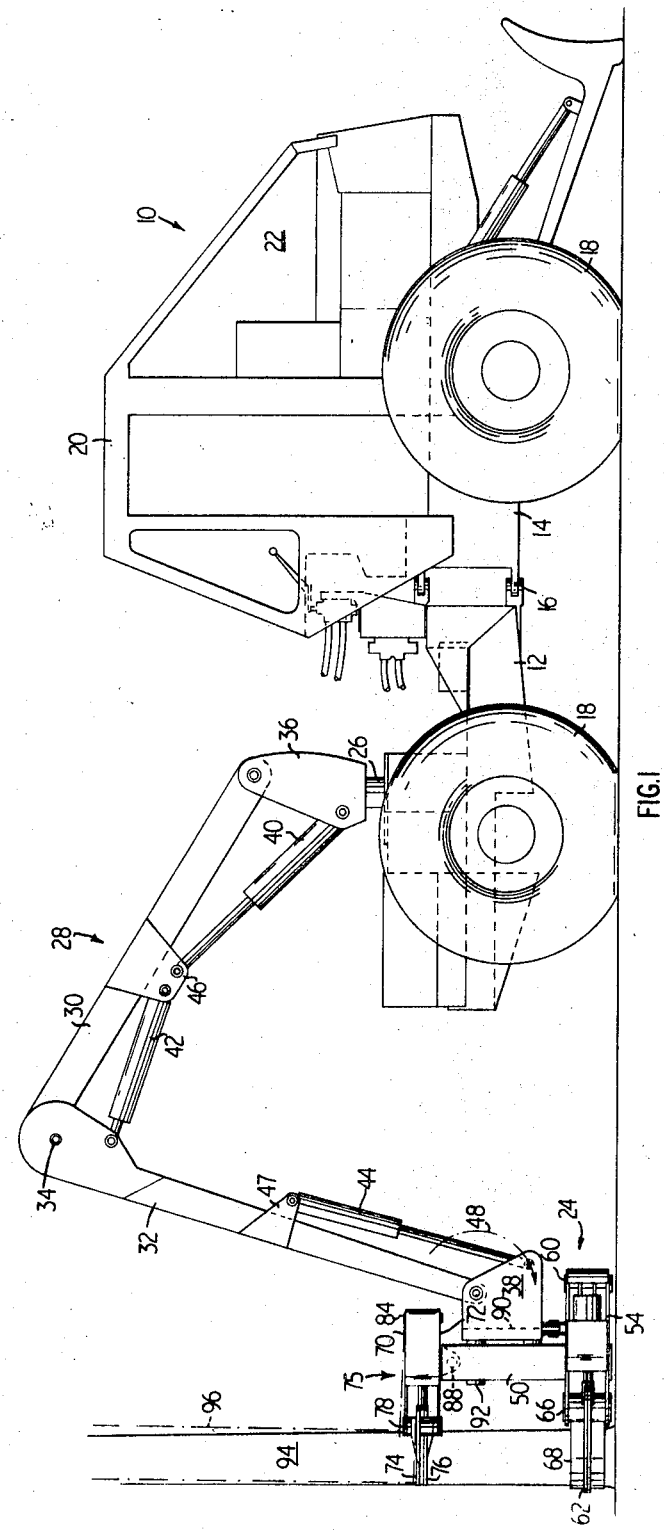
FIG. 1 is a side elevation of a logging machine utilizing a tree felling shear head in accordance with the present invention.

It will be appreciated that the shear head of the present invention can be utilized on various types of vehicles generally known as logging machines, for example, feller-skidders, feller-bunchers, roadside slashers and the like. For the purposes of this application, however, FIG. 1 shows the logging machine in the form of a feller-buncher 10. This vehicle is of the well-known type having forward and rearward frame members 12 and 14 respectively pivotally secured together by way of an articulated joint 16. The vehicle is motor powered and its tractive effort is concentrated through rubber tires 18. The vehicle includes a semienclosed cab 20 having the motor and fuel therefor in the rear compartment 22, thereby leaving the forward end of the vehicle available for logging work.

The shear head of the present invention is indicated generally at 24 and it is operatively mounted to the forward end of vehicle 10 through a vertically oriented pivot 26 mounted on the forward frame 12 of the vehicle.

A boom 28 is pivotally mounted on the pivot 26 and includes first and second arm members 30 and 32 which are pivotally secured together at 34. The other end of first arm 30 is pivotally secured to a member 36 mounted on the pivot 26; the other end of second arm 32 being similarly secured to a mounting plate 38 on the shear head 24.

A parallelogram or similar operative control is directed to the shear head 24 from the pivot 26 by the drawing in or reaching out of arms 30 and 32 actuated by a plurality of hydraulic rams 40, 42, and 44. The yoke plate 46 serves to interconnect ends of the rams 40 and 42 and to serve as pivot points therefor with respect to the remote ends of these rams which are connected to the member 36 on the pivot 26 and to the upper end of arm 32. Movements angular from the vertical which may be taken by the head 24 with respect to the vehicle 10 and especially the arm 32, are effected by the cylinder 44 which is secured at one end to arm 32 by means of a yoke plate 47 and at the other end to the plate 38. Pivotal action of the head 24 through the action of cylinder 44 is shown by the arrow 48.

Figure 2:
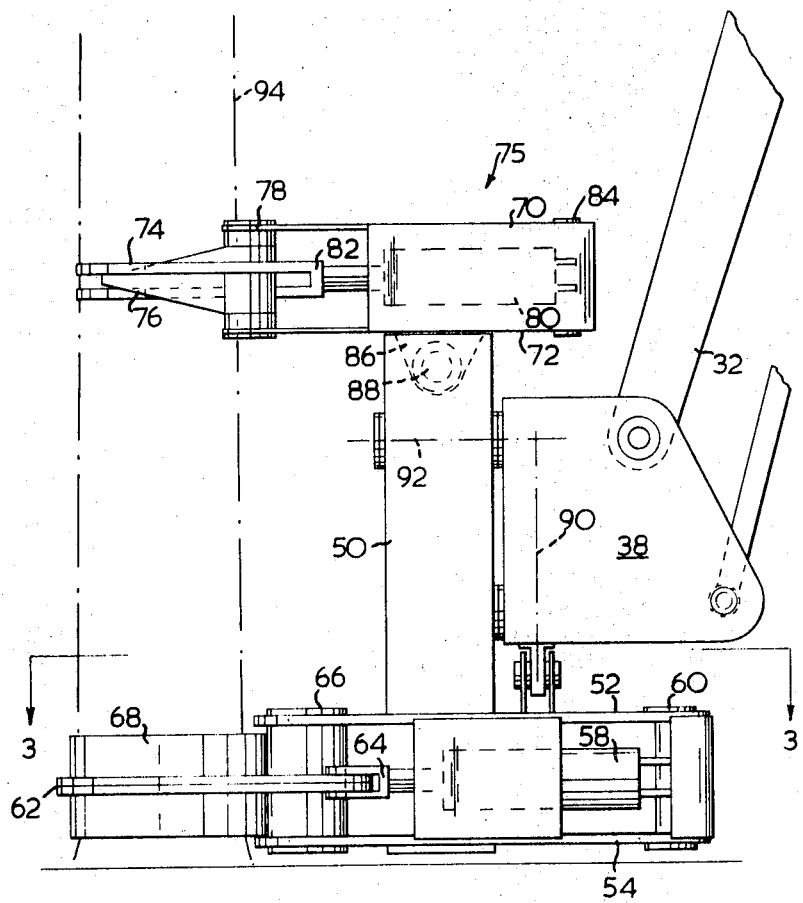
FIG. 2 is an enlarged view of the shear head as shown in FIG. 1.
Figure 3:
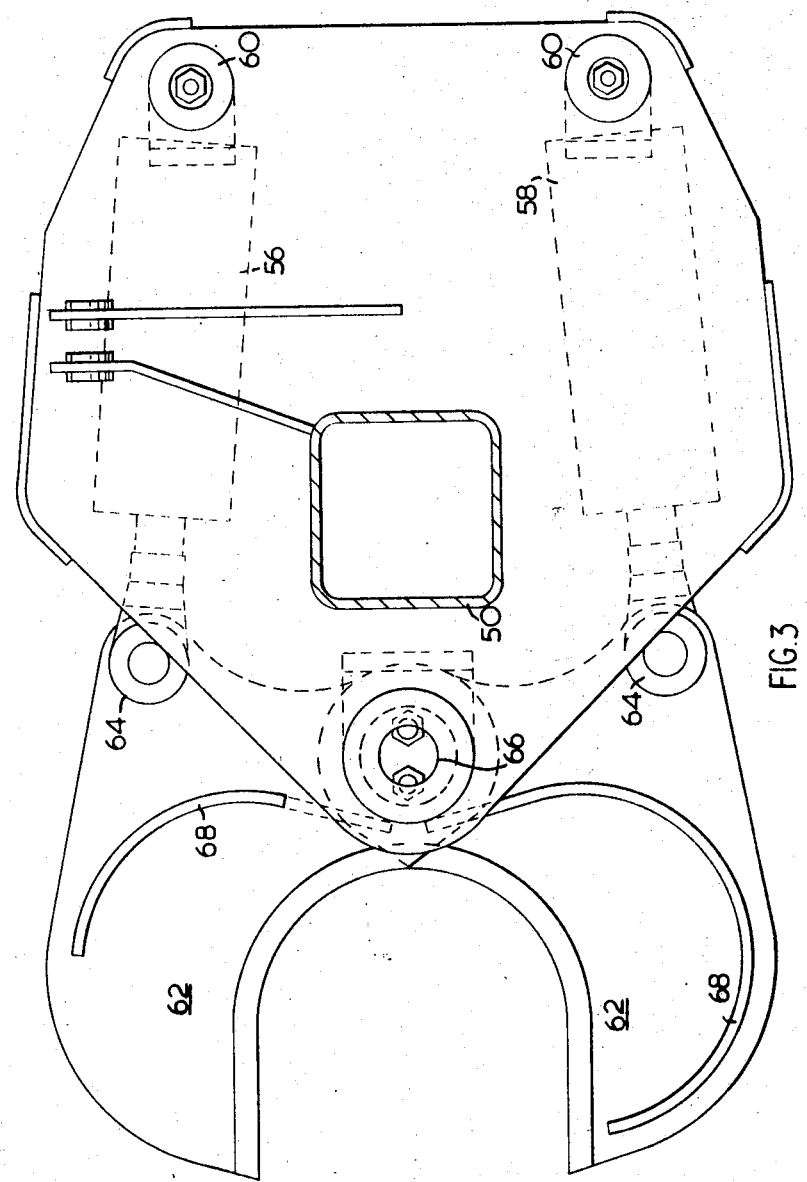
FIG. 3 is a plan view of the shear assembly.

Referring to FIGS. 2 and 3, the shear head 24 includes a mast 50 of polygonal cross section for increased strength and rigidity. The lower end of the mast 50 is provided with a pair of parallel planar plates 52, 54 respectively, these plates serving to mount a pair of shear actuating hydraulic rams 56 and 58, respectively, such mounting being by pivot pins 60 to which one end of the rams are secured. The other end of each ram is pivotally secured to an associated shear blade 62 by means of pivotal connections 64, the blades 62 being pivotally mounted to the shear head on a common vertically positioned central roll pin 66. As will be evident from FIG. 3, actuation of the cylinders 56 and 58 pivot the shears 62 to a closed position around a tree disposed between the blades. It will also be noted that the blades 62 are provided with tree retaining collars 68 which extend above and below the horizontal position of the blade 62. These collars serve to secure the lower trunk of the tree after it has been severed and it prevents that portion of the tree from swinging outwardly away from the shear blades.

The upper end of the mast 50 supports a further set of spaced horizontally arranged plates 70 and 72 respectively which serve to support tree grasping means in the form of cooperating gripping arms 74 and 76. These arms are pivotally secured to the plates 70 and 72 at spaced locations by means of pivot pins 78. Hydraulic rams 80 are pivotally secured to the arms 74 and 76 at pivot points 82 and are secured at their other ends to the plates 70 and 72 by means of pivot pins 84. The tree grasping means indicated generally at 75 is pivotally mounted to the upper end of the mast 50 by means of depending flange members 86 and a pivot pin 88.

For the purposes of stacking logs after severing, the mast 50 and the severing and grasping mechanisms may be pivoted outwardly with respect to the boom arm 32 by action of the cylinder 44.

In order for the head 24 to be properly placed on a tree trunk if the vehicle is on uneven ground, the mast 50 must pivot with respect to the plate 38 and boom 32. Thus, hydraulic cylinder 90 is pivotally secured at its lower end to the plate 52 of the shear head assembly and is connected at its upper end to the plate 38. Plate 38 in turn is pivotally connected to the mast 50 by means of a pivot pin 92. It will be appreciated therefore, that actuation of the hydraulic cylinder 90 will pivot the mast 50 and the associated shear mechanism and grasping mechanism about pin 92 with respect to the plate 38 and the boom 32.

In operation, the shear head assembly 24 is positioned with respect to a standing tree (using ram 90 is necessary) by the operator in the vehicle 10. The shear blades 62 and the tree grasping arms 74 and 76 are moved to their open positions by their respective hydraulic cylinders and then moved into operative position. Cylinders 80 actuate the arms 74 and 76 so that they clamp the tree therebetween and actuation of cylinders 56 and 58 drive the blades 62 into the lower portion of the trunk of the tree to sever it from its stump. As the two blades enter the tree and begin to meet each other, there is a substantial wedging action taking place because the thickness of the blade is such that there is a tendency to move the tree upward against the holding action of the grasping arms 74 and 76, especially if these arms were rigidly spaced from the shear blades. This increased resistance to the shear blades through the wedging action thereof is compensated for, however, by the pivotal mounting of the tree grasping section 75 to the mast 50 through the swivel pin 88. As shown in FIG. 1, when the shear blades are brought together, instead of the wedging action that previously took place, the tree is actually moved upward slightly to pivot about the pin 88 as the grasping section absorbs the width or thickness of the shear blades. It will be noted that the tree 94 has pivoted about the pin 88 so that the upper portion of the trunk assumes the position approximately as shown by the broken line 96. It will be appreciated that as soon as severing takes place, the tree is actually held at two locations, the upper location by the arms 74 and 76 and also adjacent the shears 62 by means of the associated collar members 68. The boom assembly 28 is then rotated on the pivot 26 to the side of the vehicle or to the location where the logs are being bunched, the cylinder 44 is actuated to effectively swing the severed tree 94 angularly with respect to the end of the boom and the log is dumped into a stack or bunch.

FIG. 4 diagrammatically illustrates the equal displacement of hydraulic fluid in the cylinders 80 of the grapple arms 74, 76, when a tree 94 is held in a center position. Cylinders 80 are interconnected by line 81.

If the tree tends to fall sideways as shown in FIG. 5, the space occupied by tree 94 tends to decrease, due to the relative positioning of the pivot points 78 with respect to the arms 74, 76 and the cylinders 80, and which is caused by equal displacement of fluid between cylinders 80. The result is an hydraulic lock between the arms 74, 76, preventing side topple of the tree.

It will be appreciated that this shear and felling head although shown on a feller-buncher, can also be used on such vehicles as stump harvesters and the like.

We claim:

1. A tree shearing head for use on a logging machine, said head comprising:
   a. a mast structure securable to said logging machine;
   b. tree shearing means mounted on said mast adjacent the lower end thereof for severing a tree from its stump; and
   c. tree grasping means spaced upwardly from the shearing means on the mast for grasping the tree during a shearing operation;
   d. the tree grasping means being pivotally mounted to said mast thereby allowing movement of the tree relative to the mast during shearing to relieve wedging forces between the tree and the shearing means, said pivotal mounting permitting the tree grasping means to rotate from a position substantially parallel to the tree shearing means to a position in which the portion of the tree grasping means which actually grasps the tree is more remote from said shearing means and angularly inclined with respect thereto.

2. A shearing head according to claim 1 wherein said shearing means comprises a pair of cooperating blade members and the grasping means comprises a pair of arcuate arms to engage the surface of the tree.

3. A tree felling machine comprising a mobile vehicle adapted to maneuver adjacent standing trees; a boom mechanism mounted on the vehicle for horizontal and vertical movement with respect to the vehicle and a tree shearing head pivotally mounted to the outer end of said boom for grasping and severing a tree from its stump, said shearing head comprising:
   i. a mast structure pivotally secured to the outer end of said boom;
   ii. a pair of tree shearing blades secured to the lower end of the mast and hydraulic means for actuating said blades;
   iii. collars on said blades normal to the cutting surface thereof to engage circumferential portions of the tree after severing;
   iv. tree grasping means mounted on the upper end of the mast and including a pair of arcuate arms adapted to engage portions of the tree surface during a severing operation;
   v. hydraulic means interconnected together and actuating said arcuate arms; and
   vi. a pivotal connection between the tree grasping means and the upper end of the mast to allow movement of the grasping means and the tree relative to the mast during shearing thereby to relive wedging forces between the tree and the shear blades, said pivotal connection permitting the tree grasping means to rotate from a position substantially parallel to the tree shearing means to a position in which the portion of the tree grasping means which actually grasps the tree is more remote from said shearing means and angularly inclined with respect thereto.

* * * * *